(12) United States Patent
Nagami et al.

(10) Patent No.: US 9,643,662 B2
(45) Date of Patent: *May 9, 2017

(54) CAB FOR WORK VEHICLE AND WORK VEHICLE

(71) Applicant: KOMATSU LTD., Tokyo (JP)

(72) Inventors: Kouji Nagami, Hirakata (JP); Masamichi Miyazaki, Neyagawa (JP)

(73) Assignee: KOMATSU LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/803,526

(22) Filed: Jul. 20, 2015

(65) Prior Publication Data
US 2015/0321705 A1 Nov. 12, 2015

Related U.S. Application Data

(63) Continuation of application No. 13/700,003, filed as application No. PCT/JP2012/065225 on Jun. 14, 2012, now Pat. No. 9,126,643.

(30) Foreign Application Priority Data

Feb. 23, 2012 (JP) .................................. 2012-037376

(51) Int. Cl.
| | | |
|---|---|---|
| B62D 33/06 | (2006.01) | |
| B60H 1/00 | (2006.01) | |
| B60K 11/04 | (2006.01) | |
| E02F 9/16 | (2006.01) | |
| B60K 11/00 | (2006.01) | |
| E02F 9/08 | (2006.01) | |

(52) U.S. Cl.
CPC .......... B62D 33/0617 (2013.01); B60K 11/00 (2013.01); B60K 11/04 (2013.01); E02F 9/0866 (2013.01); E02F 9/163 (2013.01)

(58) Field of Classification Search
CPC .. B62D 33/0617; B60H 1/00378; E02F 9/163
USPC ................... 180/291, 89.12, 89.19; 280/782; 296/190.08, 190.09, 208; 454/145, 147
See application file for complete search history.

(56) References Cited

U.S. PATENT DOCUMENTS

| | | |
|---|---|---|
| 3,776,358 A | 12/1973 | Williams |
| 4,088,364 A | 5/1978 | Termont |
| 4,120,527 A | 10/1978 | Lawrence |

(Continued)

FOREIGN PATENT DOCUMENTS

| | | |
|---|---|---|
| CN | 102196930 A | 9/2011 |
| JP | 57-134926 | 2/1956 |

(Continued)

*Primary Examiner* — Frank Vanaman
(74) *Attorney, Agent, or Firm* — Drinker Biddle & Reath LLP

(57) ABSTRACT

A center pillar (3) has a pipe structure having a hollow space (3a). In the center pillar (3), a lower end opening (3c) for connecting the hollow space (3a) to an outdoor space and an upper end opening (3b) for connecting the hollow space (3a) to an indoor space (10) are formed. The lower end opening (3c) and the upper end opening (3b) are arranged at a prescribed distance from each other in a longitudinal direction of the center pillar (3). Thus, a cab for work vehicle and a work vehicle capable of preventing dust, water, or the like from entering the cab and realizing an environment in the cab comfortable for an operator are obtained.

6 Claims, 16 Drawing Sheets

(56) References Cited

U.S. PATENT DOCUMENTS

| | | | |
|---|---|---|---|
| 4,711,159 A * | 12/1987 | Armbruster | B60H 3/0616 |
| | | | 454/137 |
| 5,119,718 A | 6/1992 | Wagner et al. | |
| 5,273,340 A | 12/1993 | Nelson et al. | |
| 6,186,886 B1 * | 2/2001 | Farrington | B60H 1/243 |
| | | | 454/124 |
| 7,537,074 B2 | 5/2009 | Ishii et al. | |
| 8,491,041 B2 | 7/2013 | Fukunaga et al. | |
| 2005/0077062 A1 | 4/2005 | Fukazawa et al. | |
| 2011/0201263 A1 * | 8/2011 | Srinivasan | B60H 1/248 |
| | | | 454/141 |
| 2011/0250832 A1 | 10/2011 | Mayr et al. | |
| 2012/0086236 A1 | 4/2012 | Nagami et al. | |
| 2012/0247848 A1 * | 10/2012 | Kosaka | B60H 1/00278 |
| | | | 180/68.1 |

FOREIGN PATENT DOCUMENTS

| | | | |
|---|---|---|---|
| JP | 61-163714 | 10/1986 | |
| JP | 6-87148 | 12/1994 | |
| JP | 2001-20320 A | 1/2001 | |
| JP | 2001-81811 | 3/2001 | |
| JP | 2005-113674 | 4/2005 | |
| JP | 2006-2540 | 1/2006 | |
| JP | 2006-240568 | 9/2006 | |
| JP | 2008-195348 | 8/2008 | |
| JP | 2008-302796 A | 12/2008 | |
| JP | 2009-120046 | 6/2009 | |
| WO | 2010-049380 | 5/2010 | |
| WO | WO 2010/140514 A1 | 12/2010 | |
| WO | WO2011/074335 A1 * | 6/2011 | B60K 11/06 |

* cited by examiner

CAB FOR WORK VEHICLE AND WORK VEHICLE

TECHNICAL FIELD

The present invention relates to a cab for work vehicle and a work vehicle.

BACKGROUND ART

In order to prevent penetration of dust, water, or the like, an air pressure in an operator's compartment (a cab) (an internal pressure) of such a work vehicle as a bulldozer has been made higher than an air pressure outside the cab (an external pressure) by blowing air from an air-conditioner. A technique for thus preventing penetration of dust particle or noise from the outside by improving hermeticity in the cab is disclosed, for example, in Japanese Patent Laying-Open No. 2001-81811 (PTL 1).

In Japanese Patent Laying-Open No. 2001-81811, a cab is formed by fitting a floor frame to a cab main body having an opening in a bottom portion and a gap between the cab main body and the floor frame is sealed. Here, a sealing member is either interposed between upper and lower joint surfaces of a mount portion on a cab main body side and the floor frame or arranged between an outer peripheral portion of the floor frame and an inner peripheral portion on the cab main body side opposed thereto.

CITATION LIST

Patent Literature

PTL 1: Japanese Patent Laying-Open No. 2001-81811

SUMMARY OF INVENTION

Technical Problem

As a result of improved performance of an air-conditioner on one hand and higher hermeticity in the cab on the other hand, however, a differential pressure between an internal pressure and an external pressure may exceed a threshold value beyond which an operator in the cab feels uncomfortable.

The present invention was made in view of the problem above, and an object thereof is to provide a cab for work vehicle and a work vehicle capable of preventing dust, water, or the like from entering the cab and realizing an environment in the cab comfortable for an operator.

Solution to Problem

A cab for work vehicle according to the present invention includes a floor frame and a plurality of pillars. The plurality of pillars are erected on the floor frame. At least one pillar of the plurality of pillars has a pipe structure having a first hollow space. In the at least one pillar, a first opening for connecting the first hollow space to an outdoor space outside an indoor space surrounded by the plurality of pillars and a second opening for connecting the first hollow space to the indoor space are formed. The first opening and the second opening are arranged at a prescribed distance from each other in a longitudinal direction of the pillar.

According to the cab for work vehicle in the present invention, air in the indoor space in the cab can be exhausted to the outdoor space through the first hollow space in the pillar. Therefore, a differential pressure between an internal pressure and an external pressure in the cab can be suppressed to be lower than a threshold value and an environment in the cab comfortable for an operator can be realized.

In addition, the first opening for connection to the outdoor space and the second opening for connection to the indoor space are arranged at a prescribed distance from each other in the longitudinal direction of the pillar. Therefore, penetration of dust, water, or the like from the outdoor space into the indoor space can be prevented.

It is noted that the first opening may be connected to the outdoor space by directly opening into the outdoor space, or it may be connected to the outdoor space indirectly through other spaces, other holes, or the like. The first opening should only be connected to the outdoor space such that the function and effect above can be achieved.

In the cab for work vehicle above, the plurality of pillars include a front pillar, a center pillar, and a rear pillar sequentially arranged from front to rear of the cab. The center pillar has the pipe structure having the first hollow space and has an upper end opening through which the first hollow space opens at an upper end of the center pillar and a lower end opening through which the first hollow space opens at a lower end of the center pillar. The lower end opening is the first opening and the upper end opening is the second opening.

By thus providing the first opening as the lower end opening of the center pillar and providing the second opening as the upper end opening of the center pillar, the first opening and the second opening can be arranged at a prescribed distance from each other in the longitudinal direction of the center pillar. Thus, penetration of dust, water, or the like from the outdoor space into the indoor space can be prevented. In addition, the first opening for connection to the outdoor space is the lower end opening of the center pillar and it opens downward. Therefore, as compared with the case where an opening opens upward into the outdoor space, dust, water, or the like is less likely to enter the indoor space through the first opening.

The cab for work vehicle above further includes a cab structure member other than the plurality of pillars. The cab structure member has a second hollow space partitioned off the indoor space and a third opening for connecting the second hollow space to the indoor space. The second hollow space is constructed to be connected to the outdoor space through the first opening.

Thus, since air can be exhausted also from the indoor space of the cab to the outdoor space through the second hollow space in the cab structure member other than the pillar, air can more efficiently be exhausted. In addition, since the second hollow space in the cab structure member and the first hollow space in the pillar are both connected to the outdoor space through the first opening and they share the opening connected to the outdoor space, it is not necessary to separately provide an opening in the first and second hollow spaces. Therefore, the number of openings can be reduced and high strength of the cab can be maintained.

In the cab for work vehicle above, the floor frame has a double-walled floor board structure constituted of a lower floor board and an upper floor board arranged at a distance from each other, and a third hollow space lying between the lower floor board and the upper floor board is constructed to be connected to the outdoor space through the first opening.

Thus, air can be exhausted to the outdoor space also by making use of the hollow space in the double-walled floor structure.

A work vehicle according to the present invention includes a vehicle frame, any cab for work vehicle described above, an engine, and an engine cooling module. The vehicle frame has a front end and a rear end. The cab for work vehicle is mounted on the vehicle frame, between the front end and the rear end of the vehicle frame. The engine is attached to the vehicle frame on a side of the front end relative to the cab for work vehicle. The engine cooling module serves for cooling the engine and it is attached to the vehicle frame at the rear end. The cab for work vehicle has a projection portion projecting outward from the vehicle frame in a top plan view and an outdoor-side opening communicating with the first opening in a lower surface of the projection portion.

The work vehicle according to the present invention has the outdoor-side opening communicating with the first opening in the lower surface of the projection portion projecting outward from the vehicle frame. Therefore, air in the indoor space in the cab is prevented from being suctioned and exhausted to the outdoor space by induced draft caused by a fan in the cooling module. Thus, an air-conditioner can provide an appropriate pressure to the indoor space in the cab. Therefore, since dust particle or the like can be prevented from entering the indoor space in the cab through the outdoor-side opening, a desired differential pressure can be ensured in the indoor space in the cab and comfort for an operator is improved.

In the work vehicle above, the outdoor-side opening includes a plurality of openings separate from one another.

Thus, since stress can be prevented from concentrating on one opening, the total opening area of the plurality of openings can be made equal to an opening area of one opening, and a size of each one opening can be made smaller, large dust particle can also be prevented from entering the indoor space in the cab.

Advantageous Effects of Invention

As described above, according to the present invention, dust, water, or the like can be prevented from entering a cab and an environment in the cab comfortable for an operator can be realized.

DESCRIPTION OF EMBODIMENTS

An embodiment of the present invention will be described hereinafter with reference to the drawings.

Figure 1:
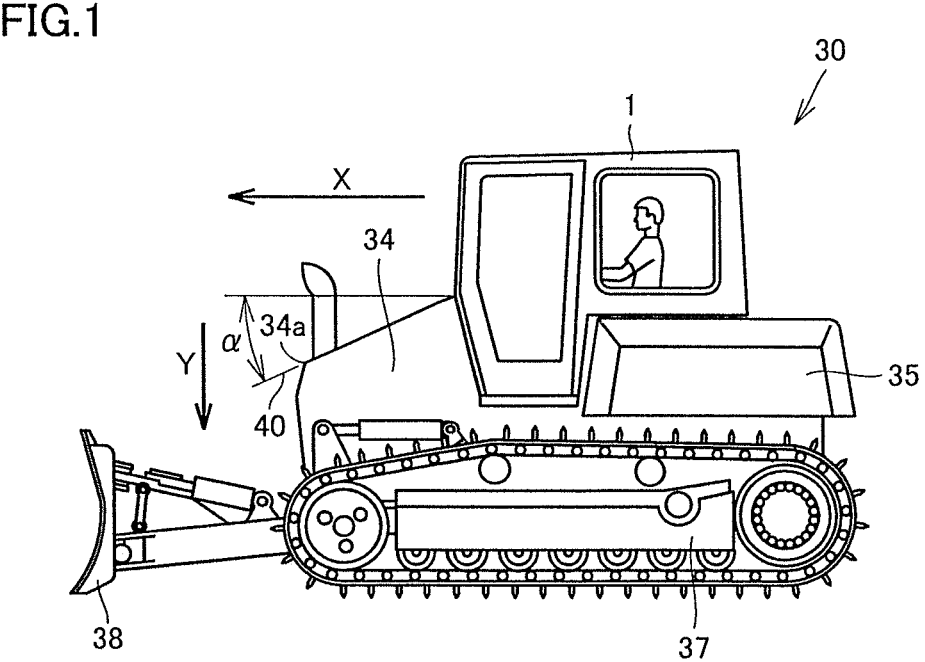
FIG. 1 is a side view schematically showing a construction of a work vehicle in one embodiment of the present invention.
Figure 2:
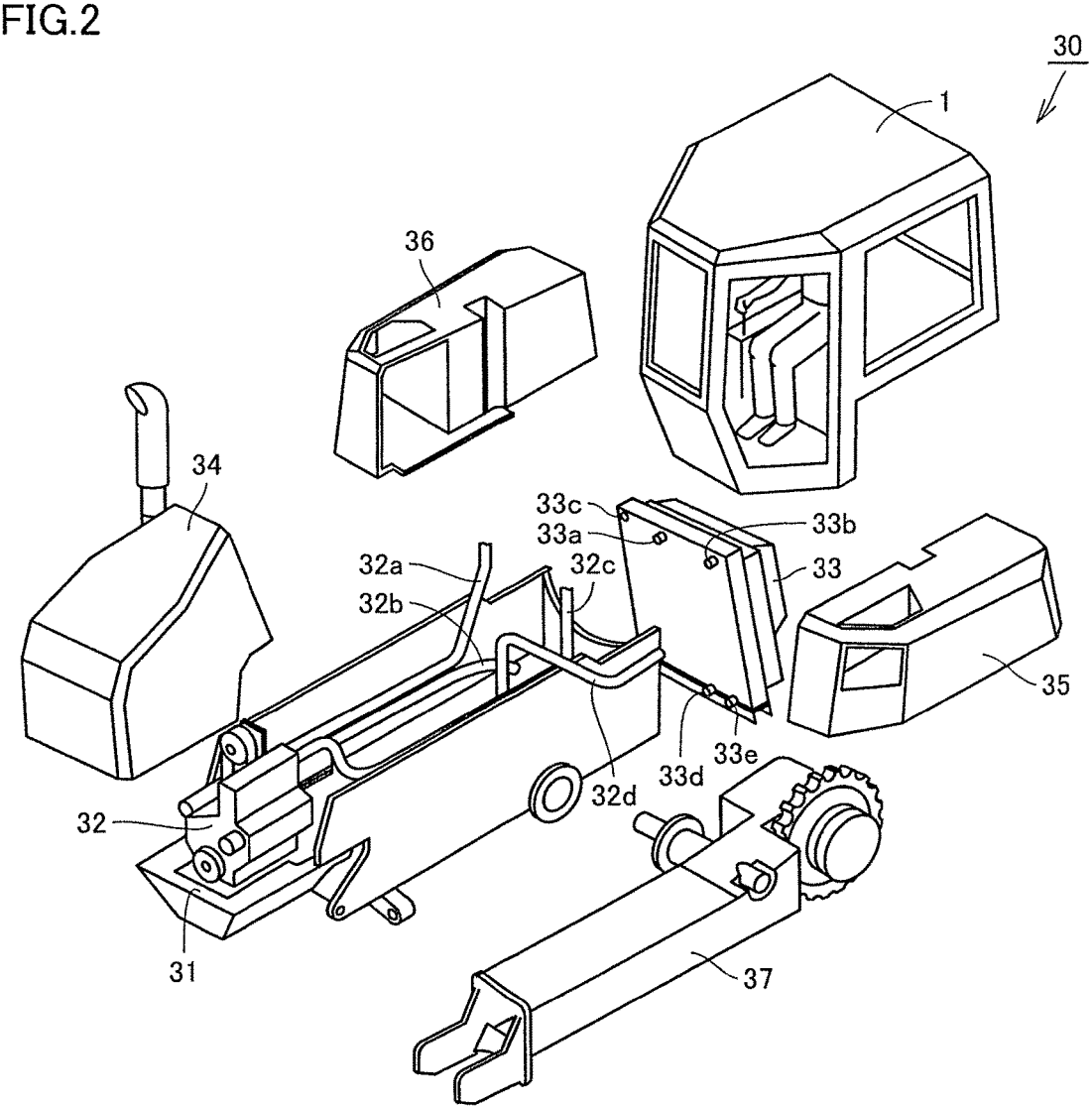
FIG. 2 is an exploded perspective view schematically showing the construction of the work vehicle in one embodiment of the present invention.

Referring to FIGS. 1 and 2, a bulldozer 30 which is a work vehicle in the present embodiment mainly has a cab 1, a vehicle frame 31, an engine 32, an engine cooling module 33, a nose portion module 34, a hydraulic oil tank module 35, a fuel tank module 36, a pair of track frame modules 37, and a dozing blade 38. Cab 1 is a shelter for accommodating an operator's platform.

Vehicle frame 31 has a front end and a rear end. Cab 1 is mounted on vehicle frame 31, between the front end and the rear end of vehicle frame 31. An operator's seat, an instrument panel, a steering mechanism, and the like are attached to this cab 1. Engine 32 is attached to vehicle frame 31 on a front end side of vehicle frame 31 relative to cab 1.

Nose portion module 34 covers engine 32 and an engine compartment. Cab 1 is arranged in the rear of engine 32 and the engine compartment covered with nose portion module 34.

Hydraulic oil tank module 35 serves to store hydraulic oil for actuating a work implement such as dozing blade 38 of bulldozer 30 and it is arranged on one side of cab 1. Fuel tank module 36 serves to store fuel to be supplied to engine 32 and it is arranged on the other side of cab 1.

Cooling module 33 serves to cool engine 32 and the like and it is attached to vehicle frame 31 at the rear end of vehicle frame 31. Cooling module 33 can include a radiator body portion including a charged air cooling (CAC) apparatus, a hydraulic oil cooling apparatus, an engine cooling water cooling apparatus, and a cooling fan. The bulldozer in which cooling module 33 is arranged at the rear end of vehicle frame 31 as described above is better in front viewability as a vehicle than a general bulldozer in which a cooling module is arranged on a front side of a vehicle frame. This is because a bulldozer with such arrangement can have a shorter length in a front-rear direction of nose portion module 34 and a smaller height of nose portion module 34.

The cooling fan in cooling module 33 can electrically or hydraulically be driven independently of engine 32 by an electric motor, a hydraulic motor, or the like. In a suitable construction, a fan speed is variable by means of hydraulic drive.

Cooling fluid conduits 32*c*, 32*d* are connected to an inlet port 33*b* and an outlet port 33*e* of cooling module 33. Thus, air taken into the engine is cooled. Similarly, conduits 32*a*, 32*b* are connected to an inlet port 33*c* and an outlet port (not shown) of cooling module 33. Thus, engine cooling water is cooled. An additional conduit (not shown) is connected to an inlet port 33*a* and an outlet port 33*d* of cooling module 33. Thus, cooled hydraulic oil is supplied to a hydraulic circuit of a vehicle.

Cooling module 33 is arranged in the rear of cab 1, between a rear end portion of hydraulic oil tank module 35 and a rear end portion of fuel tank module 36. This construction provides excellent visibility in the rear of bulldozer 30, because an operator can visually recognize an area above cooling module 33, between hydraulic oil tank module 35 and fuel tank module 36.

The pair of track frame modules 37 is arranged on left and right sides of vehicle frame 31, respectively. Dozing blade 38 is arranged in the front relative to the front end of vehicle frame 31.

Figure 3:
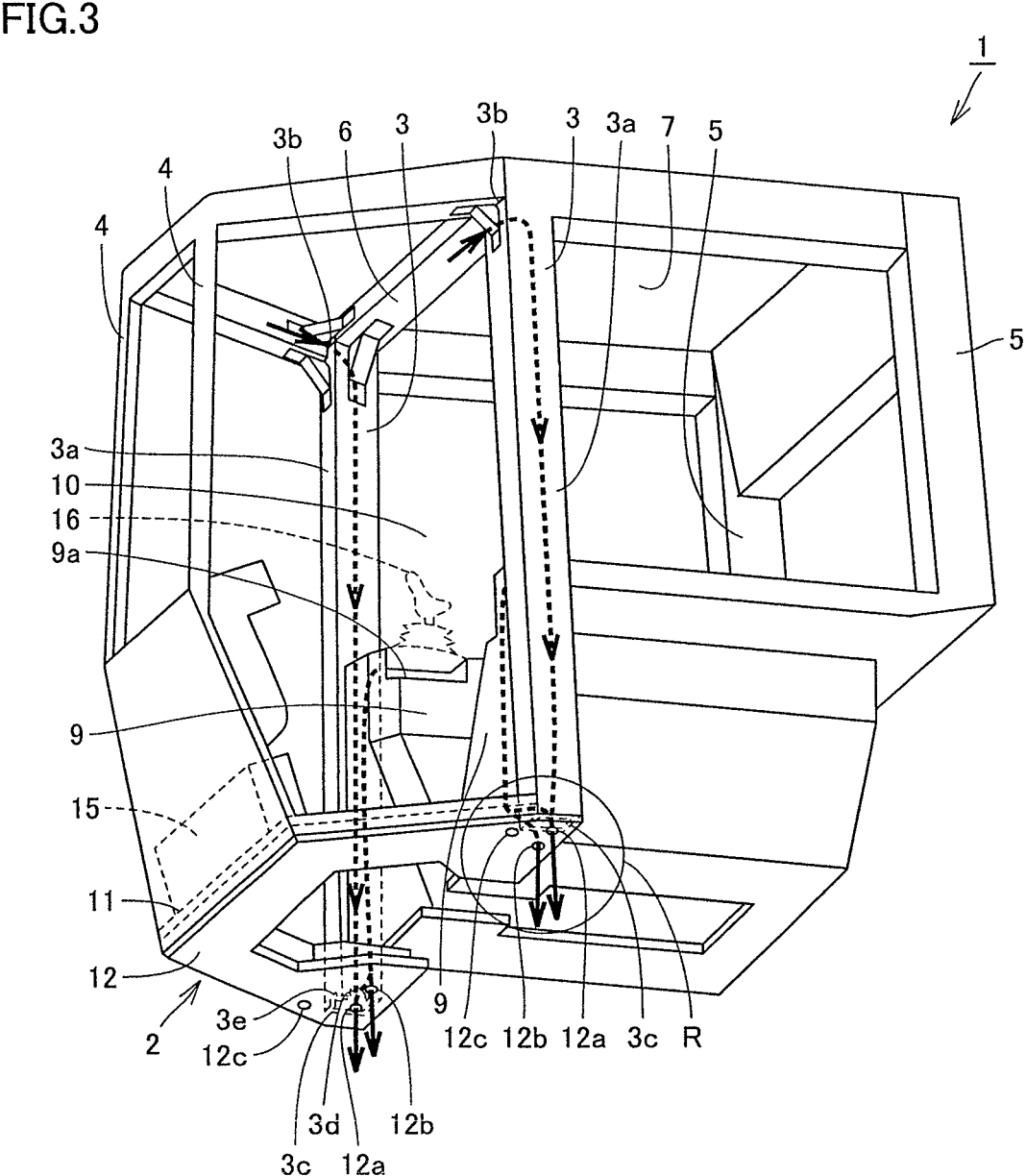
FIG. 3 is a perspective view schematically showing from below a construction of a cab for work vehicle in one embodiment of the present invention.
Figure 4:
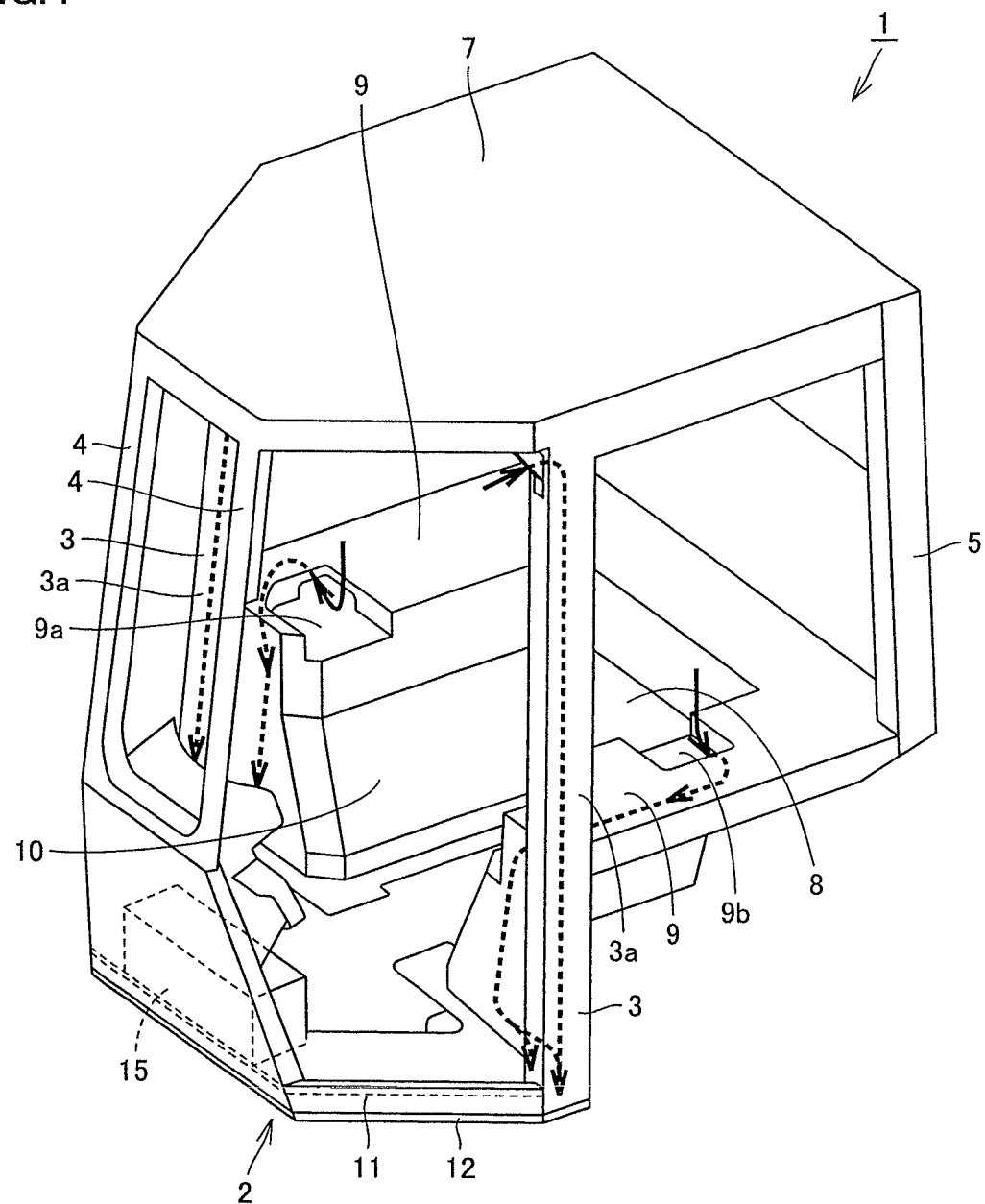
FIG. 4 is a perspective view schematically showing from above the construction of the cab for work vehicle in one embodiment of the present invention.

Referring to FIGS. 3 and 4, cab 1 for work vehicle in the present embodiment mainly has a floor frame 2, a plurality of pillars 3, 4, 5, a beam member 6, a roof portion 7, and an air-conditioning apparatus 15 (hereinafter denoted as an air-conditioner).

Floor frame 2 is arranged at a bottom portion of cab 1. This floor frame 2 is constituted of an upper floor board 11 and a lower floor board 12 arranged at a distance from each other. Upper floor board 11 and lower floor board 12 have a double-walled floor board structure in a hollow box shape. With this structure, noise introduced into cab 1 from below the floor board is reduced.

The plurality of pillars 3, 4, 5 are arranged in a side portion of cab 1 and erected on floor frame 2. Each pillar 3, 4, 5 is arranged such that its longitudinal direction extends in a vertical direction. The plurality of pillars 3, 4, 5 include a pair of center pillars 3 on the left and right, a pair of front pillars 4 on the left and right, and a pair of rear pillars 5 on the left and right. Front pillar 4, center pillar 3, and rear pillar 5 are arranged sequentially in this order from the front to the rear of cab 1.

Roof portion 7 is arranged in an upper portion of cab 1 and supported against floor frame 2 by the plurality of pillars 3, 4, 5. Beam member 6 is connected to each of upper end portions of the pair of center pillars 3 on the left and right and connected to roof portion 7.

A space surrounded by floor frame 2, the plurality of pillars 3, 4, 5, and roof portion 7 is defined as an indoor space 10 in cab 1. Air-conditioner 15 is arranged at a lower front end of this indoor space 10. As this air-conditioner blows air, an air pressure in indoor space 10 in cab 1 (internal pressure) can be made higher than an air pressure in an outdoor space (external pressure) outside indoor space 10 (pressurized).

In indoor space 10, an attachment portion 8 at an operator's seat on which an operator sits is provided. On each of left and right sides of this attachment portion 8 at the operator's seat, an attachment portion 9 for attaching an operating lever, a wire harness, and the like is arranged. At attachment portion 9 on the right when viewed from an operator at such a position that he/she takes a seat, for example, a recess 9*a* for attaching an operating lever 16 is provided. In addition, at attachment portion 9 on the left when viewed from the operator, for example, a recess 9*b* for attaching the wire harness is provided.

Figure 5:
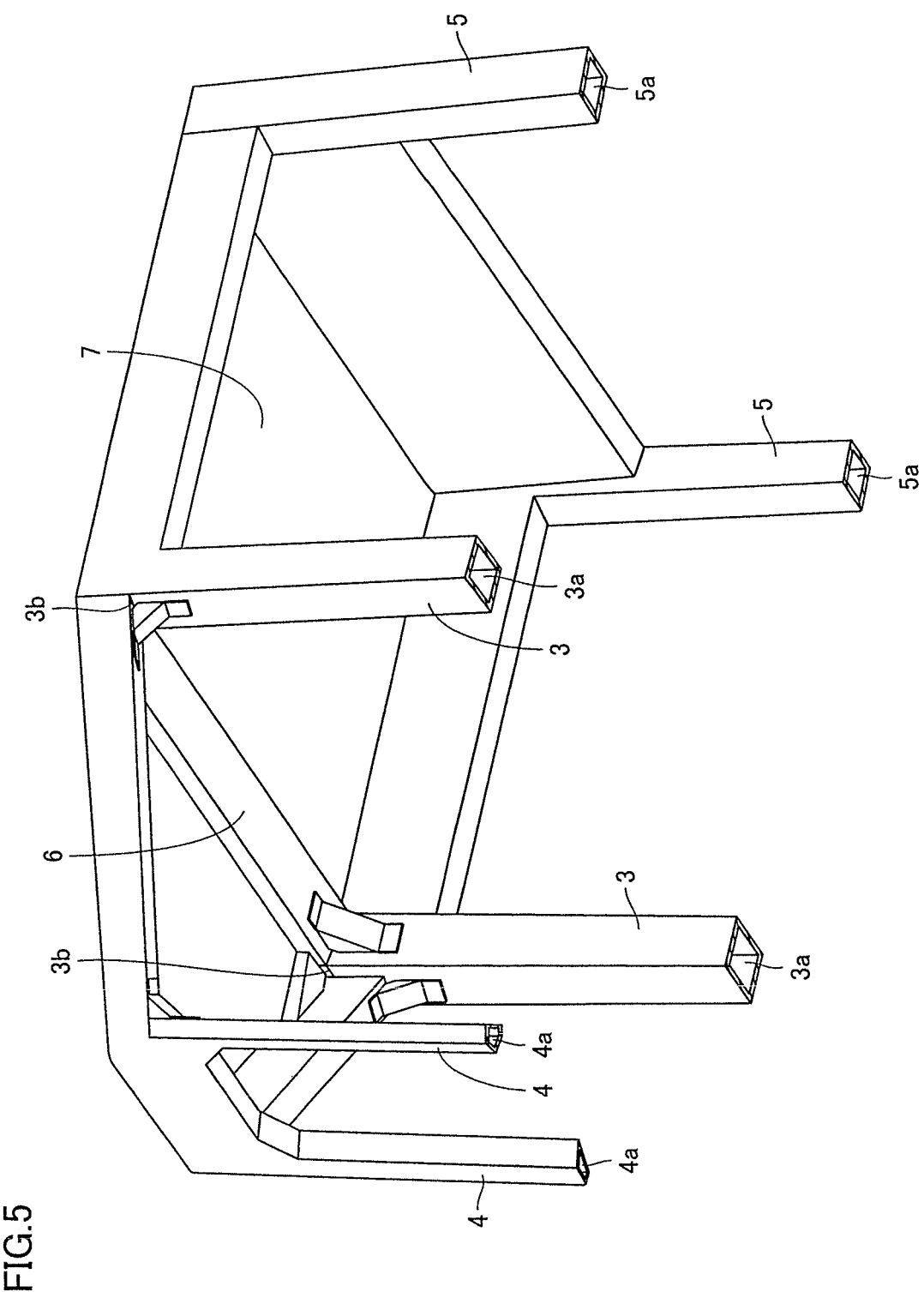
FIG. 5 is a perspective view schematically showing from below a construction of an upper portion of the cab for work vehicle in one embodiment of the present invention.
Figure 6:
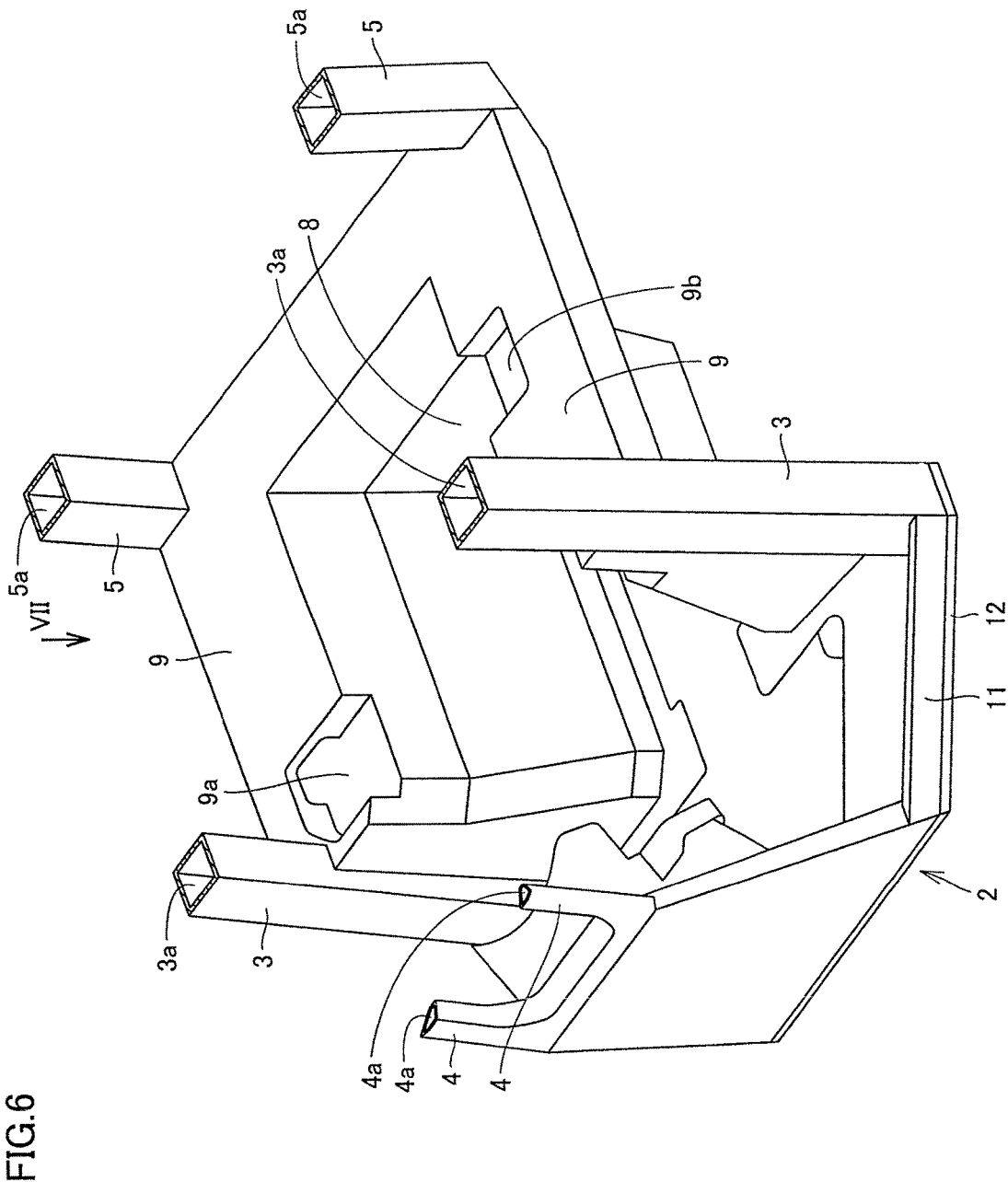
FIG. 6 is a perspective view schematically showing from above a construction of a lower portion of the cab for work vehicle in one embodiment of the present invention.
Figure 7:
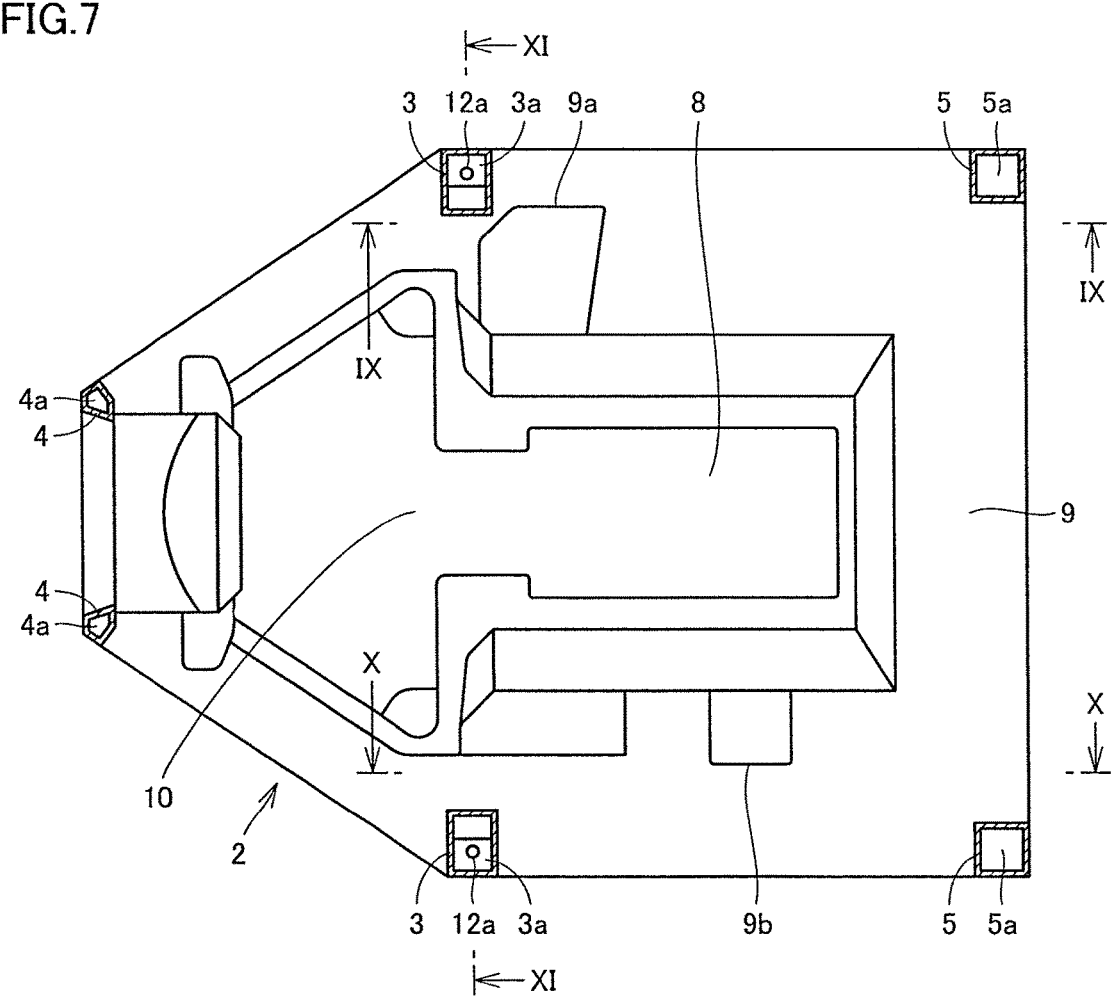
FIG. 7 is a diagram of the cab for work vehicle in one embodiment of the present invention when viewed in a direction of an arrow VII in FIG. 6.

In this cab 1, at least one pillar of the plurality of pillars 3, 4, 5 has a pipe structure having a hollow space (a first hollow space). FIG. 5 shows a construction of the upper portion of the cab. FIG. 6 shows in a perspective view, a construction of a lower portion of the cab. FIG. 7 is a top plan view of the construction shown in FIG. 6. Referring to these FIGS. 5 to 7, front pillar 4, center pillar 3, and rear pillar 5 may have hollow spaces 4*a*, 3*a*, and 5*a*, respectively.

In at least one pillar, a first opening for connecting the hollow space to the outdoor space and a second opening for connecting the hollow space to indoor space 10 are formed. Specifically, as shown in FIG. 3, for example in center pillar 3, a first opening 3*c* for connecting hollow space 3*a* to the outdoor space is formed and a second opening 3*b* for connecting hollow space 3*a* to indoor space 10 is formed. This first opening 3*c* is a lower end opening of center pillar 3 and second opening 3*b* is an upper end opening of center pillar 3 and an indoor-side opening.

Figure 8:
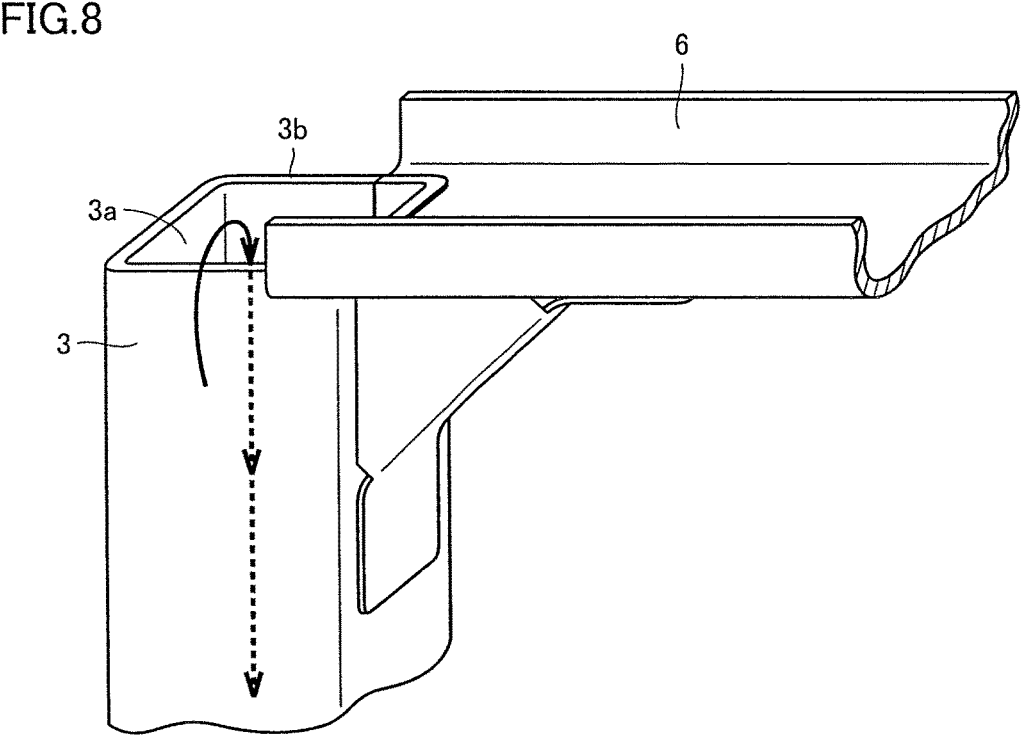
FIG. 8 is a schematic perspective view showing a portion around an upper end portion of a center pillar of the cab for work vehicle in one embodiment of the present invention.

FIG. 8 is an enlarged view showing a portion around an upper end portion of center pillar 3. Referring to this FIG. 8, beam member 6 is connected to an upper end side portion of center pillar 3. Thus, upper end opening 3*b* of center pillar 3 is not closed by beam member 6. Therefore, a gap through which hollow space 3*a* in center pillar 3 communicates with indoor space 10 can be formed between upper end opening 3*b* of the center pillar, beam member 6, and roof portion 7.

Referring to FIG. 3, a lower end of center pillar 3 is covered with lower floor board 12 of floor frame 2. In this lower floor board 12, a through hole 12*a* is formed. This through hole 12*a* is formed directly under hollow space 3*a* in center pillar 3 to thereby connect that hollow space 3*a* to the outdoor space of cab 1. Namely, through hole 12*a* forms an outdoor-side opening which opens into the outdoor space, and lower end opening 3*c* is indirectly connected to the outdoor space via through hole 12*a*. This lower end opening 3*c* may be connected to the outdoor space by directly opening into the outdoor space.

Thus, air in indoor space 10 in cab 1 can reach lower end opening 3*c* through hollow space 3*a* from upper end opening 3*b* of center pillar 3 as shown with a bold arrow in FIG. 3 and it can be exhausted to the outdoor space of cab 1 through through hole 12*a* in lower floor board 12.

In addition, cab 1 may be constructed such that air in indoor space 10 in cab 1 can be exhausted to the outdoor space through a hollow space in a cab structure member other than the plurality of pillars 3, 4, 5 (such as attachment portion 9).

Figure 9:
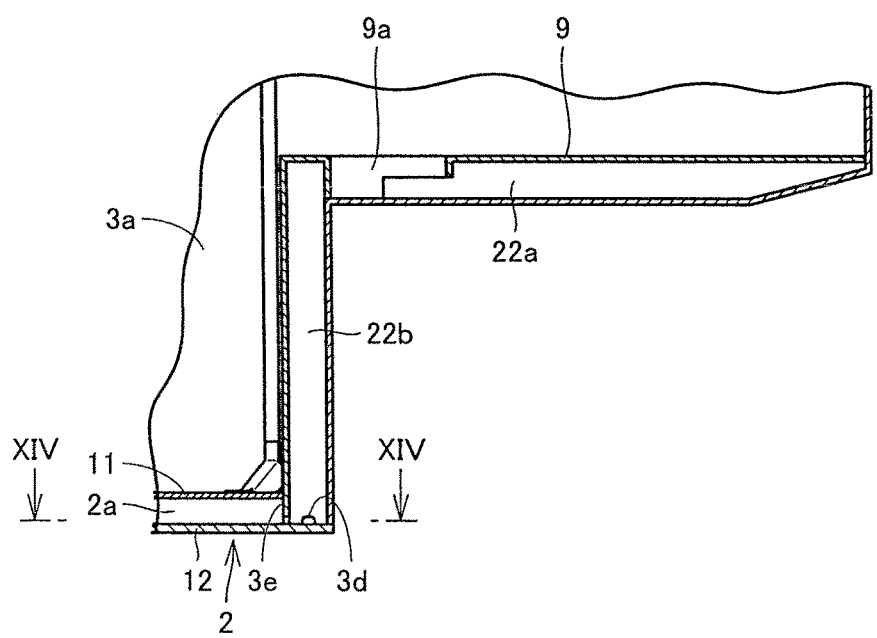
FIG. 9 is a schematic cross-sectional view along the line IX-IX in FIG. 7.

FIG. 9 is a cross-sectional view along the line IX-IX in FIG. 7. Referring to FIGS. 7 and 9, in attachment portion 9 on the right when viewed from an operator at a position where he/she takes a seat, hollow spaces 22*a*, 22*b* partitioned off indoor space 10 are formed. Hollow space 22*a* is formed in attachment portion 9 so as to extend in the front-rear direction of cab 1, and hollow space 22*b* is formed in attachment portion 9 so as to extend in the vertical direction of cab 1. These hollow space 22*a* and hollow space 22*b* are connected to each other.

Figure 12:
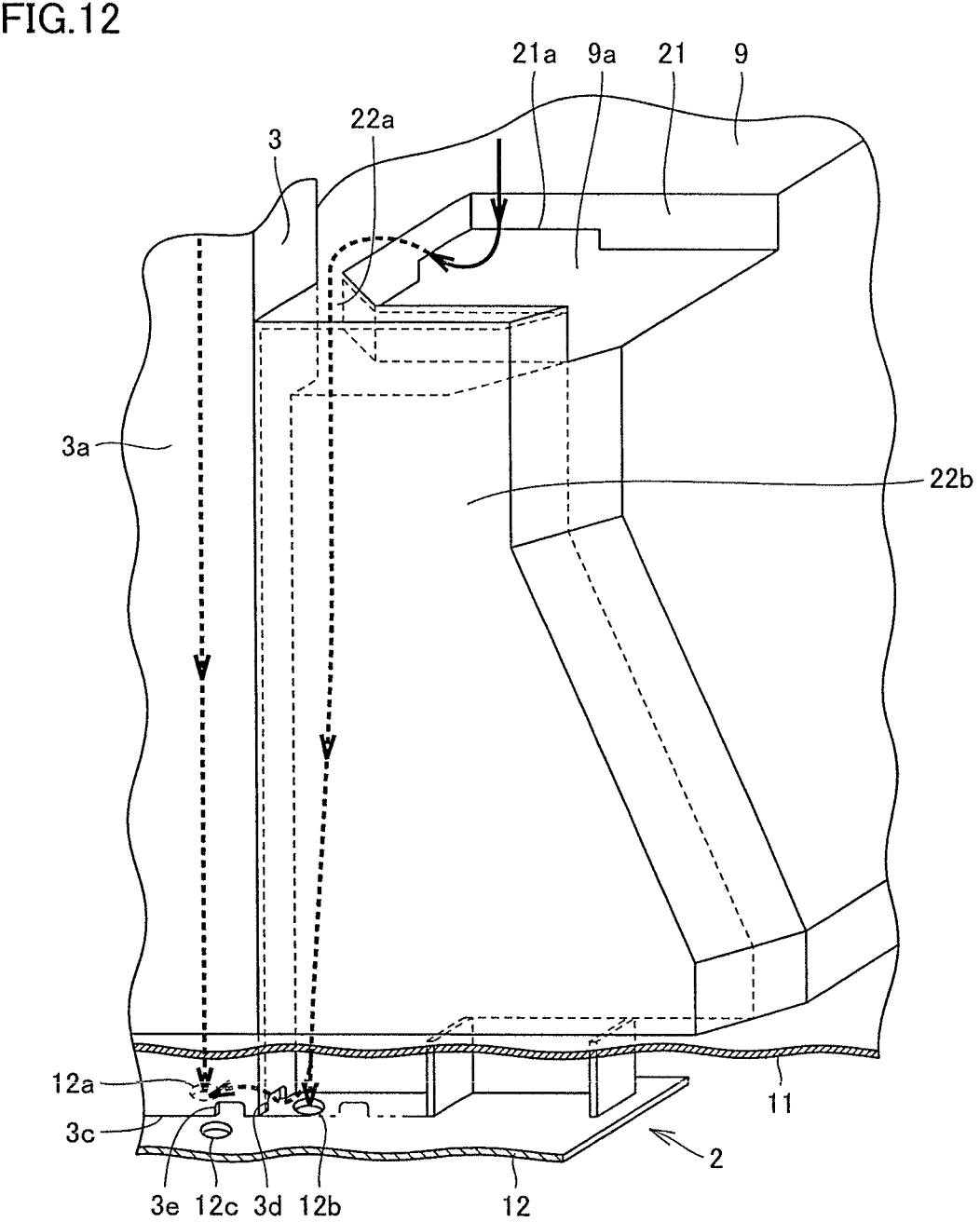
FIG. 12 is a schematic perspective view showing an exhaust path in each of a pillar and a cab structure member (on the right side).

FIG. 12 shows an exhaust path on the right in the cab. Referring to this FIG. 12, in a wall portion 21 of recess 9a formed in attachment portion 9 on the right, a notch 21a for passing a wire or the like for feeding power to the operating lever is formed. Through this notch 21a, hollow spaces 22a, 22b in attachment portion 9 on the right are connected to indoor space 10 in cab 1.

Figure 11:
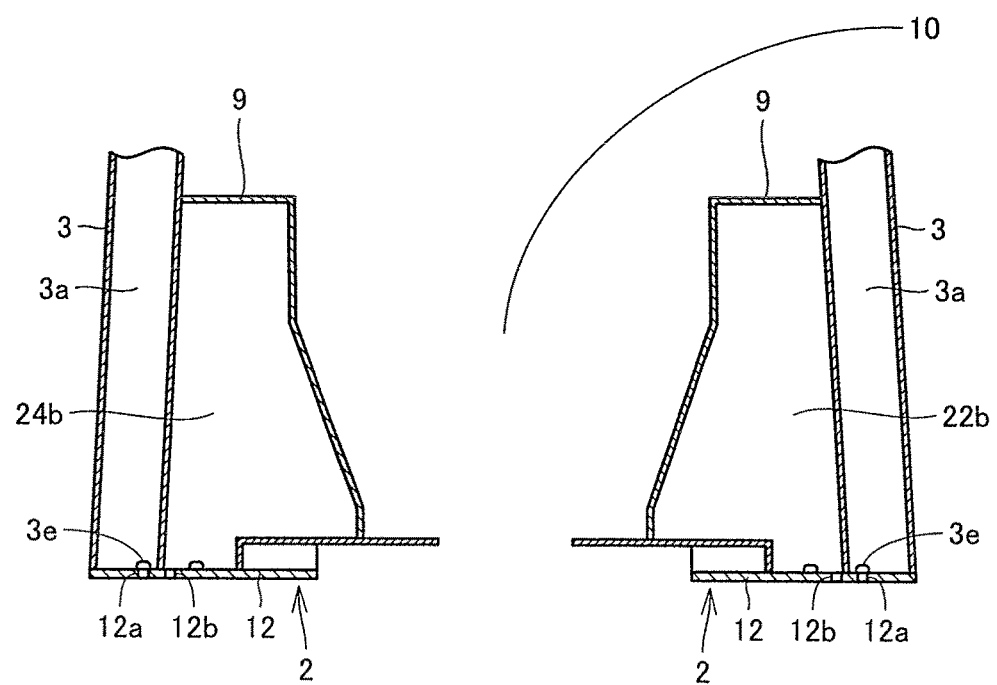
FIG. 11 is a schematic cross-sectional view along the line XI-XI in FIG. 7.

FIG. 11 shows a cross-section along the line XI-XI in FIG. 7. Referring to these FIGS. 11 and 12, a lower end of hollow space 22b in attachment portion 9 on the right is covered with lower floor board 12 of floor frame 2. A through hole 12b is formed in this lower floor board 12. This through hole 12b is formed directly under hollow space 22b and it connects that hollow space 22b to the outdoor space of cab 1.

Thus, air in indoor space 10 in cab 1 can reach the lower end of hollow space 22b through hollow spaces 22a, 22b from notch 21a of recess 9a of attachment portion 9 on the right and it can be exhausted to the outdoor space of cab 1 through through hole 12b in lower floor board 12, as shown with a bold arrow in FIG. 12.

As shown in FIG. 12, a notch 3d is formed in a lower end portion of center pillar 3. Through this notch 3d, hollow space 3a in center pillar 3 and hollow space 22b in attachment portion 9 on the right are connected to each other. Thus, hollow space 22b is constructed to be connected to the outdoor space through lower end opening 3c of center pillar 3. Therefore, air which has reached hollow space 22b through notch 21a of recess 9a can also be exhausted to the outdoor space from lower end opening 3c and through hole 12a through notch 3d and hollow space 3a in center pillar 3.

Figure 10:
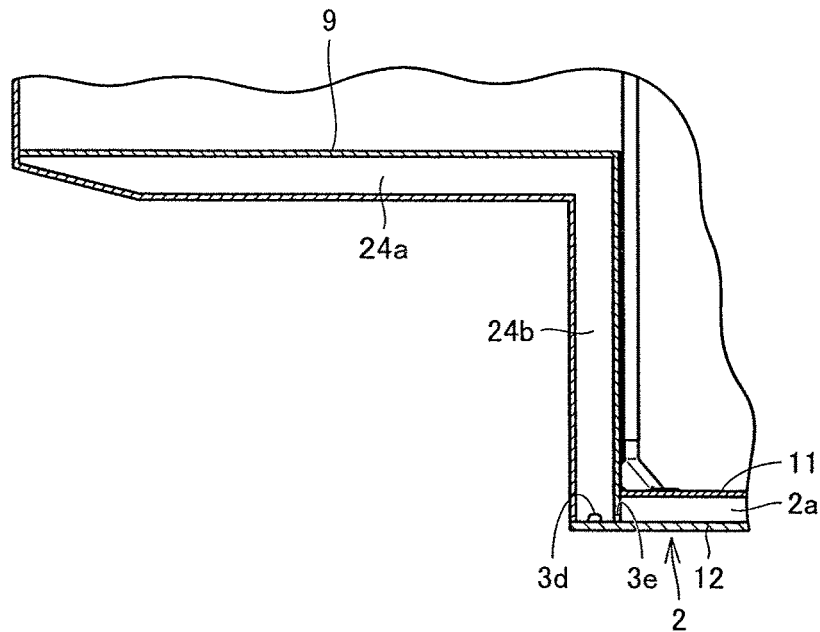
FIG. 10 is a schematic cross-sectional view along the line X-X in FIG. 7.

In addition, referring to FIGS. 7 and 10, in attachment portion 9 on the left when viewed from an operator at a position where he/she takes a seat, hollow spaces 24a, 24b partitioned off indoor space 10 are formed. Hollow space 24a is formed in attachment portion 9 so as to extend in the front-rear direction of cab 1 and hollow space 24b is formed in attachment portion 9 so as to extend in the vertical direction of cab 1. These hollow space 24a and hollow space 24b are connected to each other.

Figure 13:
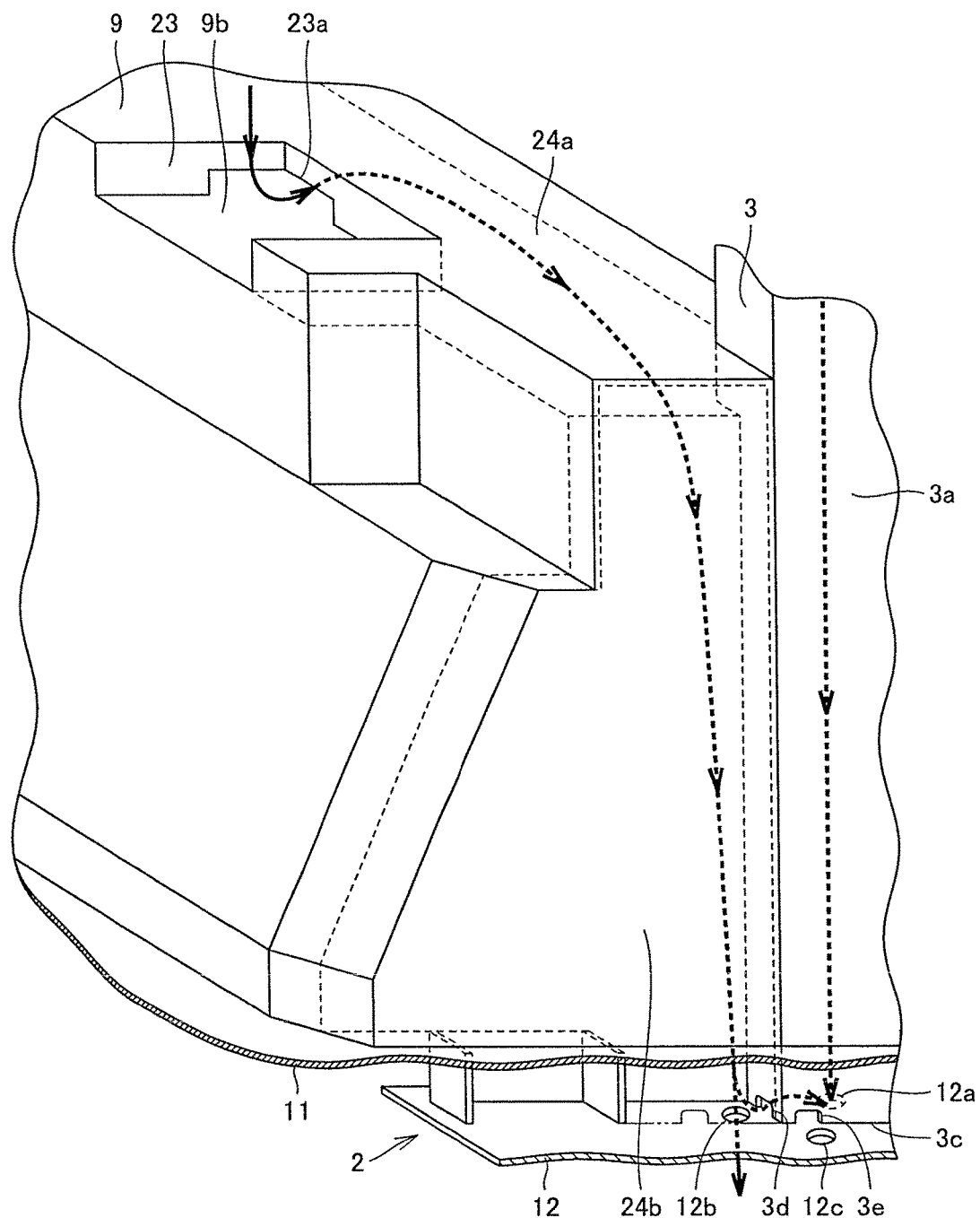
FIG. 13 is a schematic perspective view showing an exhaust path in each of a pillar and a cab structure member (on the left side).

FIG. 13 shows an exhaust path on the left in the cab. Referring to this FIG. 13, in a wall portion 23 of recess 9b formed in attachment portion 9 on the left, a notch 23a for passing the wire harness or the like is formed. Through this notch 23a, hollow spaces 24a, 24b in attachment portion 9 on the left are connected to indoor space 10 in cab 1.

Referring to FIGS. 11 and 13, a lower end of hollow space 24b in attachment portion 9 on the left is covered with lower floor board 12 of floor frame 2. Through hole 12b is formed in this lower floor board 12. This through hole 12b is formed directly under hollow space 24b, to thereby connect that hollow space 24b to the outdoor space of cab 1.

Thus, air in indoor space 10 in cab 1 can reach the lower end of hollow space 24b through hollow spaces 24a, 24b from notch 23a of recess 9b of attachment portion 9 on the left and it can be exhausted to the outdoor space of cab 1 through through hole 12b of lower floor board 12, as shown with a bold arrow in FIG. 13.

As shown in FIG. 13, notch 3d is formed in the lower end portion of center pillar 3. Through this notch 3d, hollow space 3a in center pillar 3 and hollow space 24b in attachment portion 9 on the left are connected to each other. Thus, hollow space 24b is constructed to be connected to the outdoor space through lower end opening 3c of center pillar 3. Therefore, air which has reached hollow space 24b through notch 23a of recess 9b can also be exhausted to the outdoor space from lower end opening 3c and through hole 12a through notch 3d and hollow space 3a in center pillar 3.

Referring to FIGS. 9 and 10, a hollow space (a third hollow space) 2a partitioned off indoor space 10 is formed between upper floor board 11 and lower floor board 12 constituting the double-walled floor board structure of floor frame 2.

Figure 14:
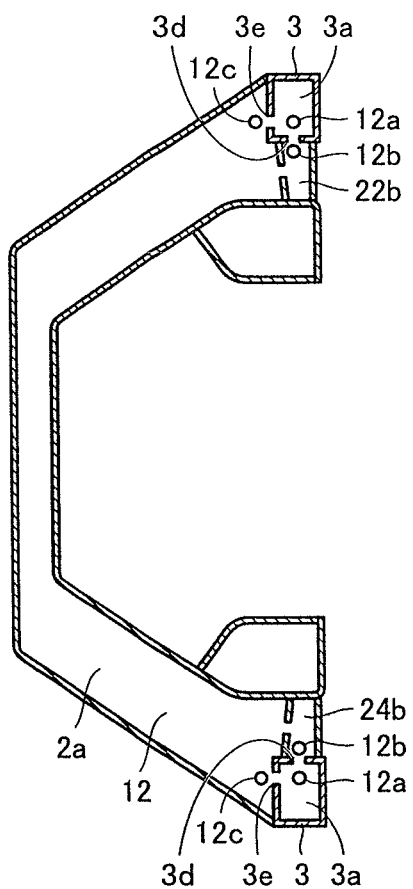
FIG. 14 is a schematic cross-sectional view along the line XIV-XIV in FIG. 9.

FIG. 14 is a cross-sectional view along the line XIV-XIV in FIG. 9. Referring to this FIG. 14, a through hole 12c is formed in lower floor board 12 so as to be located directly under this hollow space 2a. This through hole 12c connects hollow space 2a to the outdoor space of cab 1.

In addition, a notch 3e is formed in the lower end portion of center pillar 3. This notch 3e connects hollow space 3a in center pillar 3 and hollow space 2a in floor frame 2 to each other. Therefore, hollow space 2a in floor frame 2 is constructed to be connected to the outdoor space through notch 3e and hollow space 3a in center pillar 3 and further through lower end opening 3c and through hole 12a.

Moreover, each of air which has reached hollow space 3a in center pillar 3 from indoor space 10 and air which has reached hollow spaces 22b, 24b in attachment portion 9 can also be exhausted to the outdoor space from through hole 12c through notch 3e.

Figure 15:
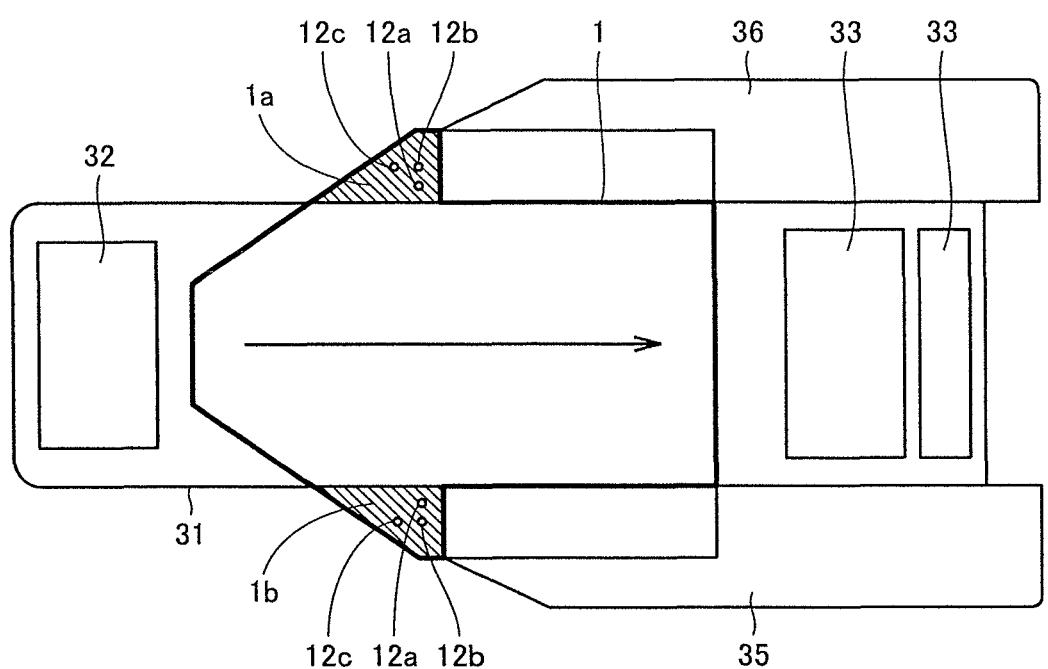
FIG. 15 is a top plan view for illustrating flow of air in a vehicle frame of the work vehicle in one embodiment of the present invention.

FIG. 15 is a top plan view of a work vehicle schematically showing flow of air in the vehicle frame. Referring to this FIG. 15, cab 1 has projection portions 1a, 1b projecting outward from vehicle frame 31 in a top plan view, and each of through holes 12a, 12b, 12c opens in a lower surface of projection portion 1a, 1b.

Figure 16:
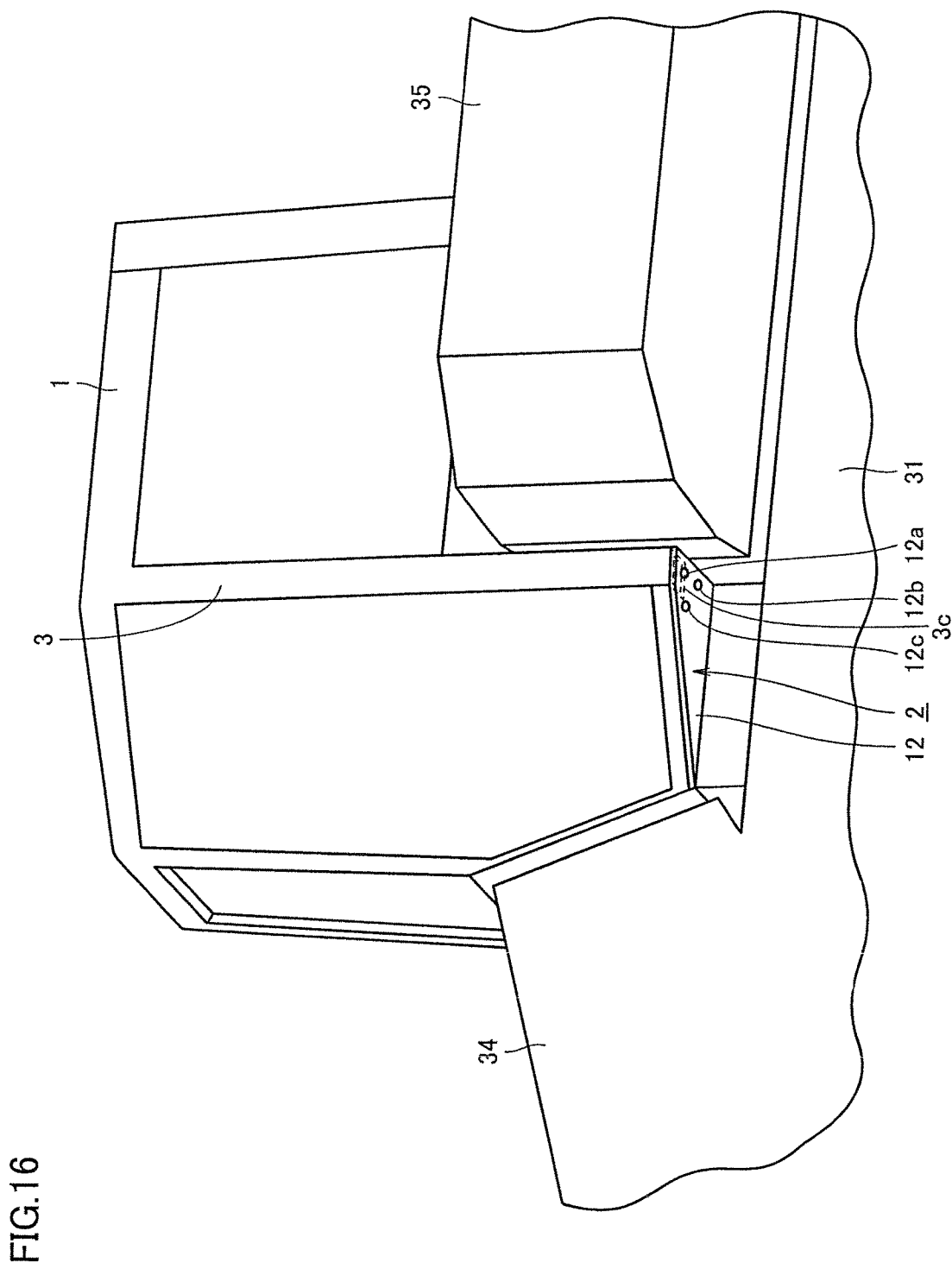
FIG. 16 is a perspective view from below, for illustrating a cab of the work vehicle in one embodiment of the present invention having a portion projecting from the vehicle frame.

Referring to FIG. 16, for example, a portion including a portion where lower end portion 3c of center pillar 3 comes in contact in lower floor board 12 of floor frame 2 projects outward from vehicle frame 31 in a top plan view. Then, the plurality of through holes 12a, 12b, 12c communicating with hollow space 3a in that center pillar 3 open in the lower surface of the portion projecting outward from that vehicle frame 31. Namely, each of the plurality of through holes 12a, 12b, 12c forms an outdoor-side opening which opens in the lower surface of each of projection portions 1a, 1b.

A function and effect of the present embodiment will now be described.

Referring to FIG. 3, according to cab 1 in the present embodiment, air in indoor space 10 in cab 1 can be taken into hollow space 3a through upper end opening 3b of center pillar 3 and can be exhausted to the outdoor space through through hole 12a communicating with lower end opening 3c. In general, when a differential pressure between an internal pressure and an external pressure in cab 1 exceeds 200 Pa, an operator in the cab is likely to feel uncomfortable. For the above-described reason, however, a differential pressure between an internal pressure and an external pressure in cab 1 can be suppressed to be lower than 200 Pa and thus an environment in the cab comfortable for the operator can be realized.

In addition, lower end opening 3c for connection to the outdoor space and upper end opening 3b for connection to indoor space 10 are arranged at a prescribed distance from each other in the longitudinal direction of center pillar 3. Therefore, penetration of dust, water, or the like into indoor space 10 from the outdoor space can be prevented.

Moreover, as described above, since upper end opening 3b is provided at the upper end located at one end in the longitudinal direction of center pillar 3 and lower end opening 3c is provided at the lower end located at the other end thereof, higher strength can be obtained than in the case where an opening is provided in a side portion of center pillar 3.

Furthermore, as shown in FIG. 3, roof portion 7 is located to cover an extension in the longitudinal direction of center pillar 3. Therefore, a path for air which enters hollow space 3*a* in center pillar 3 from indoor space 10 is bent around upper end opening 3*b*, as shown with a bold arrow. Therefore, even though dust, water, or the like is introduced into hollow space 3*a* in center pillar 3 through through holes 12*a*, 12*b*, 12*c*, dust, water, or the like cannot reach indoor space 10 unless it moves up through hollow space 3*a* and its path is bent around upper end opening 3*b*. Thus, penetration of dust, water, or the like into indoor space 10 can more effectively be prevented.

Figure 17:
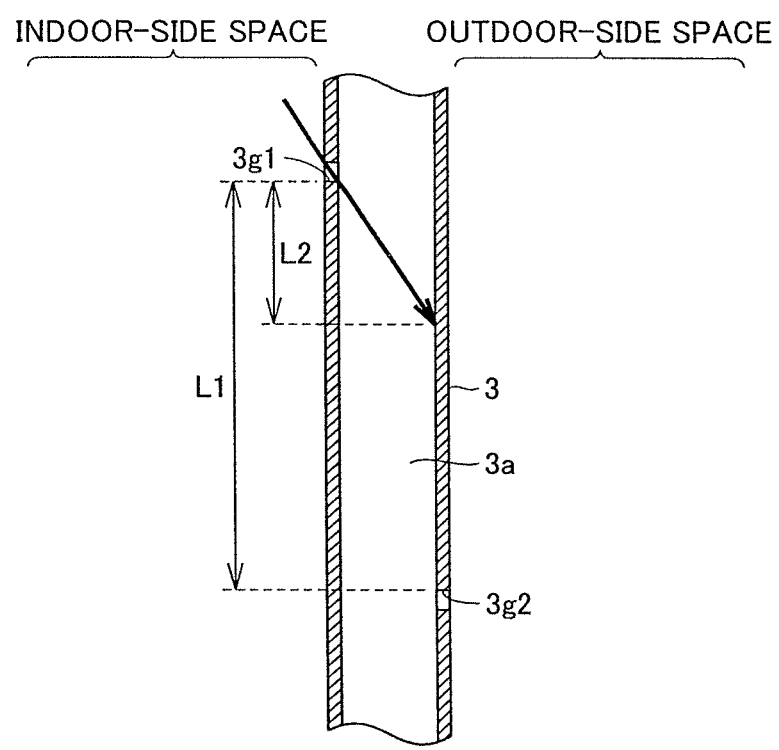
FIG. 17 is a cross-sectional view for illustrating an arrangement position of an opening which opens into an indoor space and an opening which opens into an outdoor space, both of which are provided in the pillar.

As shown in FIG. 17, both of an opening 3*g*1 communicating with indoor space 10 and an opening 3*g*2 communicating with the outdoor space may be provided in a side portion of center pillar 3. In this case, opening 3*g*1 and opening 3*g*2 are preferably arranged such that opening 3*g*2 is not reached from indoor space 10 through opening 3*g*1 in a straight path shown with an arrow in the figure. Namely, opening 3*g*1 and opening 3*g*2 are preferably arranged at a distance from each other by a prescribed distance L1 in the longitudinal direction, which is greater than a distance L2 with which opening 3*g*1 and opening 3*g*2 can be connected to each other through a straight line in a path for air.

Thus, even though dust, water, or the like is introduced into hollow space 3*a* in center pillar 3 through opening 3*g*2, dust, water, or the like cannot reach indoor space 10 through opening 3*g*1 unless its path is bent. Therefore, penetration of dust, water, or the like into indoor space 10 can more effectively be prevented.

Moreover, as shown in FIG. 3, through holes 12*a*, 12*b*, 12*c* for connection to the outdoor space open downward in the lower surface of cab 1. Therefore, as compared with the case where through holes 12*a*, 12*b*, 12*c* open upward or sideward to the outdoor space, dust, water, or the like is less likely to enter indoor space 10 through through holes 12*a*, 12*b*, 12*c*.

Moreover, as shown in FIGS. 12 and 13, air can also be exhausted to the outdoor space from indoor space 10 in cab 1 through hollow spaces 22*a*, 22*b*, 24*a*, 24*b* in a cab structure member other than the plurality of pillars 3, 4, 5 (such as attachment portion 9). Therefore, air can more efficiently be exhausted.

Furthermore, hollow spaces 22*a*, 22*b*, 24*a*, 24*b* in attachment portion 9 and hollow space 3*a* in center pillar 3 are all connected to the outdoor space through through hole 12*a* and they share through hole 12*a* connected to the outdoor space. Therefore, it is not necessary to separately provide through hole 12*a* in hollow spaces 22*a*, 22*b*, 24*a*, 24*b* in attachment portion 9 and in hollow space 3*a* in center pillar 3. Therefore, the number of through holes 12*a* can be decreased and high strength of cab 1 can be maintained.

As shown in FIG. 14, hollow space 2*a* in floor frame 2 is constructed to be connected to the outdoor space through through hole 12*a*. Thus, air can be exhausted to the outdoor space also by making use of hollow space 2*a* in the double-walled floor structure of floor frame 2.

In addition, since bulldozer 30 in the present embodiment is what is called a slant nose bulldozer, operator's front visibility is good. Further, as shown in FIG. 15, since through holes 12*a*, 12*b*, 12*c* open in the lower surface of projection portion 1*a*, 1*b* of cab 1 projecting outward from vehicle frame 31, dust particle or the like is prevented from entering indoor space 10 in cab 1 through through holes 12*a*, 12*b*, 12*c*, which will be described below.

As shown in FIGS. 1 and 2, in the present embodiment, cooling module 33 has been removed from the engine compartment. For example, cooling module 33 is moved to somewhere in bulldozer 30, which is not between a point of view of the operator in cab 1 and dozing blade 38, so that cooling module 33 cannot impair visibility of dozing blade 38. Preferably, cooling module 33 is arranged in the rear of cab 1. Since cooling module 33 is not in the engine compartment, the engine compartment can be reduced in size so that the engine can be moved to the front. By reducing the size of the engine compartment and moving engine 32 to the front, cab 1 can be moved to the front. Therefore, by providing the operator of this bulldozer 30 with front visibility of a wider angle, operator's visibility in the front of bulldozer 30 can be improved.

Additionally, by removing cooling module 33 from the engine compartment, nose portion module 34 covering the engine compartment can further be reduced in size. Thus, a volume of nose portion module 34 can be decreased. A height of the front end of nose portion module 34 is preferably decreased, because this construction can remarkably improve operator's visibility in the front of bulldozer 30 without impairing operator's visibility in the rear of bulldozer 30. In this suitable embodiment, nose portion module 34 is inclined downward from the rear side toward the front side of bulldozer 30. Thus, as shown in FIG. 13, an upper central portion of dozing blade 38 is within the operator's view.

As shown in FIG. 1, a lowest sight line 40 from an operator's point of view in bulldozer 30 in the present embodiment passes above a top portion 34*a* of nose portion module 34, so that the operator can visually recognize the upper central portion of dozing blade 38. Thus, the operator of bulldozer 30 can monitor upheaval or lifting of any material to the above of the upper central portion of dozing blade 38 during operation of the bulldozer.

It is noted that, according to sight line 40 in the present embodiment, visibility can be improved by 10 degrees to 30 degrees or more and preferably by approximately 23 degrees as shown with an angle $\alpha$ in FIG. 1.

Referring to FIG. 15, by removing cooling module 33 from the engine compartment and arranging cooling module 33 at the rear end of vehicle frame 31 as above, operator's front visibility can be improved. In this case, however, suction draft caused by the fan included in cooling module 33 causes flow of cooling air in vehicle frame 31, from the front end toward the rear end of vehicle frame 31 as shown with an arrow in FIG. 15.

Therefore, if through holes 12*a* to 12*c* of cab 1 open into an internal space in vehicle frame 31 in a top plan view, air in indoor space 10 in cab 1 is suctioned and exhausted to the outdoor space through through holes 12*a* to 12*c* due to the flow of the cooling air above while air-conditioner 15 remains stopped. Thus, indoor space 10 in cab 1 is in a negative pressure state and dust or the like may enter indoor space 10 in cab 1.

When indoor space 10 in cab 1 is pressurized by air-conditioner 15, air in indoor space 10 in cab 1 is suctioned and exhausted to the outdoor space through through holes 12*a* to 12*c* due to the flow of cooling air above, which leads to the possibility that a desired differential pressure cannot be ensured in indoor space 10 in cab 1.

In contrast, in the present embodiment, as shown in FIG. 15, through holes 12*a*, 12*b*, 12*c* open in the lower surface of projection portion 1*a*, 1*b* of cab 1, which projects outward from vehicle frame 31 in a top plan view. Therefore, air in indoor space 10 in cab 1 is prevented from being suctioned and exhausted to the outdoor space due to suction draft caused by the fan in cooling module 33. Thus, an appropriate pressure can be provided by air-conditioner 15 to indoor space 10 in cab 1. Therefore, since dust particle or the like can be prevented from entering indoor space 10 in cab 1 through through holes 12a, 12b, 12c and a desired differential pressure in indoor space 10 in cab 1 can be ensured, operator's comfort is improved.

Figure 18:
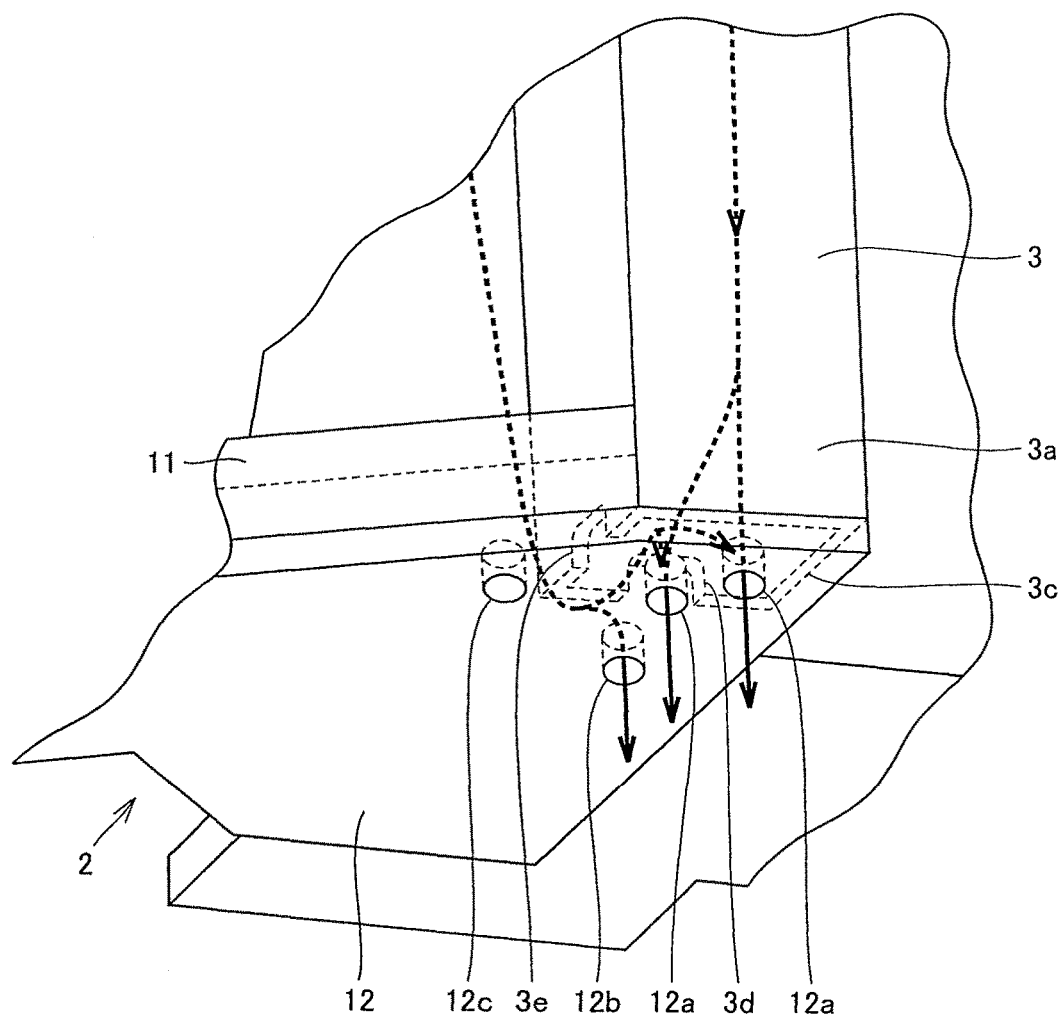
FIG. 18 is an enlarged view of a portion corresponding to a region R in FIG. 3, showing a construction where a plurality of through holes are provided directly under a hollow space in the center pillar.

Though a case where a single through hole 12a is located directly under hollow space 3a in center pillar 3 as shown in FIG. 3 and the like has been described in the present embodiment, two or more through holes 12a located directly under hollow space 3a in center pillar 3 may be provided as shown in FIG. 18. Thus, since stress can be prevented from concentrating on one through hole 12a and each through hole 12a can be reduced in size, large dust particle can also be prevented from entering indoor space 10 in cab 1.

Though a case where through holes 12a, 12b, 12c are provided in lower floor board 12 as shown in FIG. 14 has been described in the present embodiment, in the case where hollow space 3a, hollow spaces 22b, 24b, and hollow space 2a are connected to one another by providing notches 3d, 3e in the lower end portion of center pillar 3, only any one of through holes 12a, 12b, 12c may be provided.

Though an opening of a pillar for connecting the indoor space and the hollow space in the pillar to each other is provided at the upper end of the pillar as shown in FIG. 8 and the like in the present embodiment, it may be provided in a side surface of the pillar in contact with the indoor space.

Furthermore, though a bulldozer has been described as a work vehicle in the present embodiment, the work vehicle according to the present invention is not limited to a bulldozer, and other work vehicles such as a wheel loader may be applicable.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 cab for work vehicle; 1a, 1b projection portion; 2 floor frame; 2a, 3a, 4a, 22a, 22b, 24a, 24b hollow space; 3 center pillar; 3b upper end opening; 3c lower end opening; 3d, 3e notch; 3g1, 3g2 opening; 4 front pillar; 5 rear pillar; 6 beam member; 7 roof portion; 8 attachment portion at operator's seat; 9 attachment portion; 9a, 9b recess; 10 indoor space; 11 upper floor board; 12 lower floor board; 12a, 12b, 12c through hole; 15 air-conditioner; 21 wall portion; 21a, 23a notch; 23 wall portion; 30 bulldozer; 31 vehicle frame; 32 engine; 32a, 32b conduit; 32c, 32d cooling fluid conduit; 33 engine cooling module; 33a, 33b, 33c inlet port; 33d, 33e outlet port; 34 nose portion module; 34a top portion; 35 hydraulic oil tank module; 36 fuel tank module; 37 track frame module; and 38 dozing blade.

The invention claimed is:

1. A cab for work vehicle, comprising:
a floor frame;
a plurality of pillars erected on said floor frame and surrounding an indoor space of said cab,
at least one pillar of said plurality of pillars having a pipe structure having a first hollow space,
in said at least one pillar, a first opening configured to exhaust said first hollow space to outside of the work vehicle and a second opening communicating said indoor space with said first hollow space being formed, and
said first opening being a lower end opening of said at least one pillar; and
a cab structure member other than said plurality of pillars, wherein
said cab structure member has a second hollow space partitioned off said indoor space and a third opening for connecting said second hollow space to said indoor space, and
said second hollow space is constructed to be connected to the outside of the work vehicle through said first opening,
wherein said floor frame has a double-walled floor board structure constituted of a lower floor board and an upper floor board arranged at a distance from each other, and a third hollow space lying between said lower floor board and said upper floor board is constructed to be connected to the outside of the work vehicle through said first opening.

2. The cab for work vehicle according to claim 1, wherein said plurality of pillars include a front pillar, a center pillar, and a rear pillar sequentially arranged from front to rear of said cab,
said center pillar has said pipe structure having said first hollow space and has an upper end opening through which said first hollow space opens at an upper end of said center pillar, and
said upper end opening is said second opening.

3. A work vehicle, comprising:
a vehicle frame having a front end and a rear end;
the cab for work vehicle according to claim 1, mounted on said vehicle frame, between said front end and said rear end of said vehicle frame;
an engine attached to said vehicle frame on a side of said front end relative to said cab for work vehicle; and
an engine cooling module attached to said vehicle frame at said rear end, for cooling said engine,
said cab for work vehicle having
a projection portion projecting outward from said vehicle frame in a top plan view, and
an outdoor-side opening communicating with said first opening in a lower surface of said projection portion.

4. The work vehicle according to claim 3, wherein said outdoor-side opening includes a plurality of openings separate from one another.

5. The cab for work vehicle according to claim 1, wherein said first opening is arranged at a lower end of said cab.

6. The cab for work vehicle according to claim 1, said first opening and said second opening being arranged at a prescribed distance from each other in a longitudinal direction of said pillar.

* * * * *